US011560876B2

(12) United States Patent
Syrovy

(10) Patent No.: US 11,560,876 B2
(45) Date of Patent: Jan. 24, 2023

(54) STABILIZED HORIZONTAL-AXIS WIND TURBINE

(71) Applicant: George J. Syrovy, Centerville, MA (US)

(72) Inventor: George J. Syrovy, Centerville, MA (US)

(*) Notice: Subject to any disclaimer, the term of this patent is extended or adjusted under 35 U.S.C. 154(b) by 220 days.

(21) Appl. No.: 16/823,293

(22) Filed: Mar. 18, 2020

(65) Prior Publication Data

US 2020/0300224 A1    Sep. 24, 2020

Related U.S. Application Data

(60) Provisional application No. 62/990,349, filed on Mar. 16, 2020, provisional application No. 62/820,066, filed on Mar. 18, 2019.

(51) Int. Cl.
*F03D 13/20* (2016.01)
*F03D 7/02* (2006.01)
(Continued)

(52) U.S. Cl.
CPC .......... *F03D 13/20* (2016.05); *E04H 12/345* (2013.01); *F03D 1/02* (2013.01); *F03D 7/0204* (2013.01);
(Continued)

(58) Field of Classification Search
CPC . F03D 13/20; F03D 13/25; F03D 1/02; F03D 7/0204; F03D 7/0216;
(Continued)

(56) References Cited

U.S. PATENT DOCUMENTS 226,036 A * 3/1880 Calvin ................. F03D 7/0212
416/10
4,323,331 A   4/1982 Schachle et al.
(Continued)

FOREIGN PATENT DOCUMENTS

CH        695790 A5    8/2006
DE      3224976 A1    1/1984
(Continued)

OTHER PUBLICATIONS

How Do Wind Turbines Work?; Department of Energy—Wind Energy Technologies Office; https://www.energy.gov/eere/wind/how-do-wind-turbines-work.
(Continued)

*Primary Examiner* — Brian P Wolcott
*Assistant Examiner* — Joshua R Beebe
(74) *Attorney, Agent, or Firm* — Sandberg Phoenix & von Gontard PC

(57) ABSTRACT

The nacelle of a horizontal axis wind turbine is fixedly mounted on a tower, and the tower is mounted off-center with respect to a ring around which it is rotatable. The tower is a tripod. Two legs of the tripod are of fixed length and lie in a plane perpendicular to the axis of rotation of the turbine blades. The third leg of the tripod is of adjustable length and is aligned with the axis of rotation of the turbine blades. The third leg thus may be controlled to adjust for pitching of the base and other purposes. Multiple turbines, spaced apart laterally, may be mounted on a platform in a fixed orientation, with the platform rotatably mounted off-center relative to a base.

17 Claims, 16 Drawing Sheets

(51) Int. Cl.
E04H 12/34 (2006.01)
F03D 1/02 (2006.01)
F03D 13/25 (2016.01)

(52) U.S. Cl.
CPC ......... F03D 7/0216 (2013.01); F03D 7/0224 (2013.01); F03D 13/25 (2016.05); F05B 2240/93 (2013.01); F05B 2270/3201 (2013.01); F05B 2270/321 (2013.01)

(58) Field of Classification Search
CPC ........ F03D 7/0224; F03D 7/02; F04H 12/345; F05B 240/93; F05B 2270/3201; F05B 2270/321
See application file for complete search history.

(56) References Cited

U.S. PATENT DOCUMENTS

| | | | | |
|---|---|---|---|---|
| 4,362,466 | A * | 12/1982 | Schonball | F03D 7/0216 416/41 |
| 6,132,172 | A * | 10/2000 | Li | F03D 7/0216 416/201 A |
| 7,008,172 | B2 | 3/2006 | Selsam | |
| 7,323,792 | B2 * | 1/2008 | Sohn | F03D 13/10 290/55 |
| 8,598,731 | B2 * | 12/2013 | Pitre | F03D 3/061 290/55 |
| 8,866,325 | B2 | 10/2014 | Syrovy | |
| 8,884,458 | B2 * | 11/2014 | Williams | F03D 9/28 290/55 |
| 10,024,307 | B2 | 7/2018 | Selsam | |
| 10,584,682 | B2 * | 3/2020 | Hong | F03D 15/10 415/7 |
| 2011/0018269 | A1 | 1/2011 | Moser et al. | |
| 2012/0171034 | A1 * | 7/2012 | Gabeiras | B63B 43/06 416/9 |
| 2013/0127173 | A1 * | 5/2013 | Lee | F03D 1/02 290/55 |
| 2014/0077505 | A1 * | 3/2014 | Ishimine | F03D 9/25 290/55 |
| 2015/0167646 | A1 * | 6/2015 | Hammerum | F03D 7/0224 416/1 |
| 2015/0247486 | A1 | 9/2015 | Wepfer | |
| 2015/0337804 | A1 * | 11/2015 | Jensen | F03D 7/0248 416/169 R |
| 2017/0175712 | A1 | 6/2017 | Barber | |
| 2017/0241408 | A1 | 8/2017 | Von Heland | |

FOREIGN PATENT DOCUMENTS

| | | |
|---|---|---|
| JP | 2008163928 A | 7/2008 |
| WO | 2002095223 A1 | 11/2002 |
| WO | 2007009464 A1 | 1/2007 |
| WO | 2011120521 A1 | 10/2011 |
| WO | 20130135291 A1 | 9/2013 |
| WO | 2014125114 A1 | 8/2014 |
| WO | 2018234986 A1 | 12/2018 |

OTHER PUBLICATIONS

Bringsvaerd; The Future Is Floating; https://www.blog.renewaluk.com/post/the-future-is-floating; Apr. 30, 2019; pp. 1-3.
Hywind Scotland—equinor.com; https://www.equinor.com/en/what-we-do/floating-wind/hywind-scotland.html; Nov. 28, 2019; pp. 1-4.
Darius Snieckus; Powering Floating Wind Into The Future; htttps://www.rechargenews.com/wind/powering-floating-wind-into-the-future/2-1-295989 Jun. 17, 2019; pp. 1-4.
The Future is Afloat; Innovation—https://www.eltek.com/us/insights/the-future-is-afloat/; Jul. 10, 2018; pp. 1-4.
Roger Harabin; BBC News; World's First Floating Wind Farm Emerges Off Coast of Scotland; https://www.bbc.com/news/business-40699979; Jul. 23, 2017; pp. 1-15.
economist.com; Science Technology Quarterly; Tilting in the Breeze; Sep. 3, 2009.
Wikipedia; Wind Turbine Design; https://en.wiikipedia.org/wiki/Wind_turbine_design; Mar. 16, 2020; pp. 1-13.
Wikipedia; Floating wind turbine; https://en.wiikipedia.org/wiki/Floating_wind_turbine; Mar. 15, 2020; pp. 1-8.
Parts of WindTurbine—Power—Plant—Instrumentation Forum; Mar. 16, 2020; https://instrumentationforum.com/t/parts-of-wind-turbine/4829/print; pp. 1-2.
Gimbal Stabilized—https://www.researchgate.net/figure/Wind-turbine-model-with-gimbal-support-The-gimbal-is-blocked-for-fixed-case_fig2_273226622; 2014; pp. 1-8.
Gimbal Stabilized—https://www.researchgate.net/figure/Wind-tunnel-setup-The-scales-are-changed-for-visual-clarification_fig1_273226622; 2014; pp. 1-8.
TenneT Concludes First Contract for Subsea Cables for Offshore grid; http://w3.windfair.net/wind-energy/news/23422-tennet-concludes-first-contract-for-subsea-cables-for-offshore-grid; Nov. 11, 2016; pp. 1-3.
Hume, D.; The Liquid Grid; Energy/Offshore Wind; Going Deeper: A New Solution for Offshore Wind; https://theliquidgrid.com/2017/01/29/new-kid-block-offshore-wind-industry/; Jan. 29, 2017 (updated Jan. 31, 2017)'; pp. 1-12.
How Big Is a Wind Turbine?; National Wind Watch, Inc.; www.wind-watch.org; Size of Industrial Wind Turbines; FAQ—Size; https://www.wind-watch.org/faq-size-p.php; pp. 1-3.
European Patent Office Search Report for corresponding European Application No. 20169819.8-1007 dated Jul. 1, 2020.

* cited by examiner

FIG. 14A
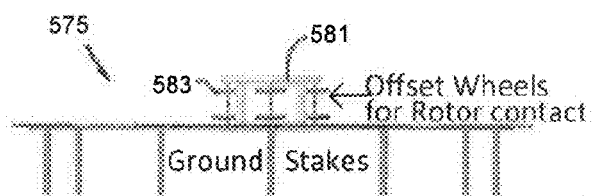
FIG. 14C
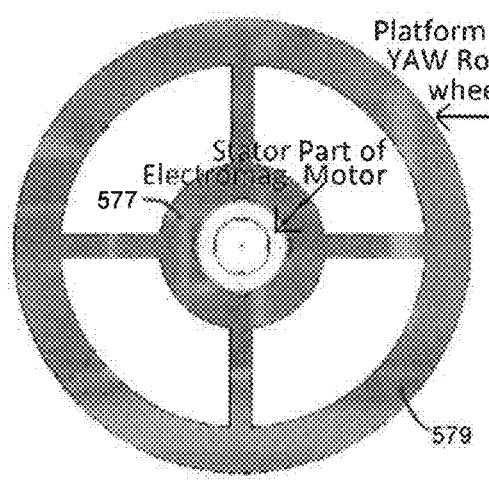
FIG. 14B
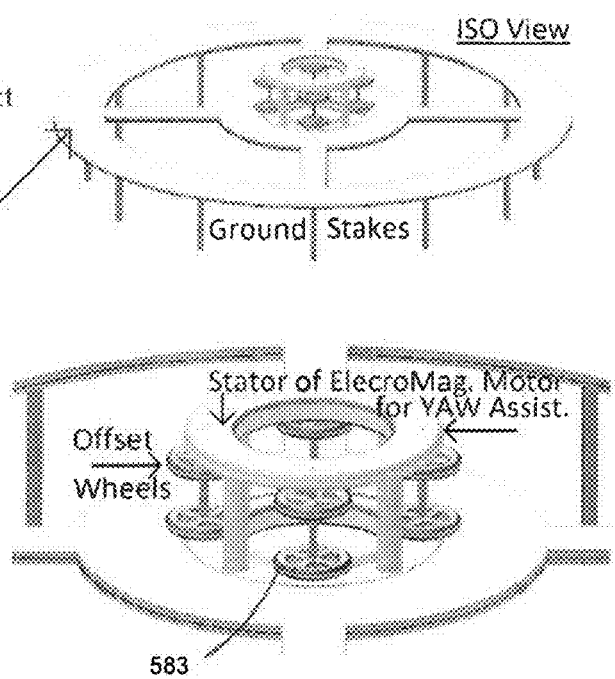
FIG. 14D

FIG. 15A
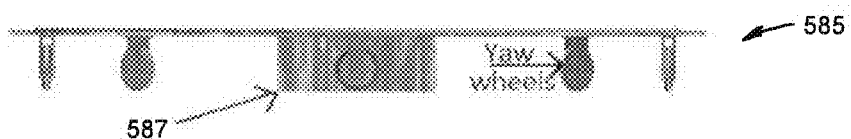
FIG. 15B
FIG. 15C
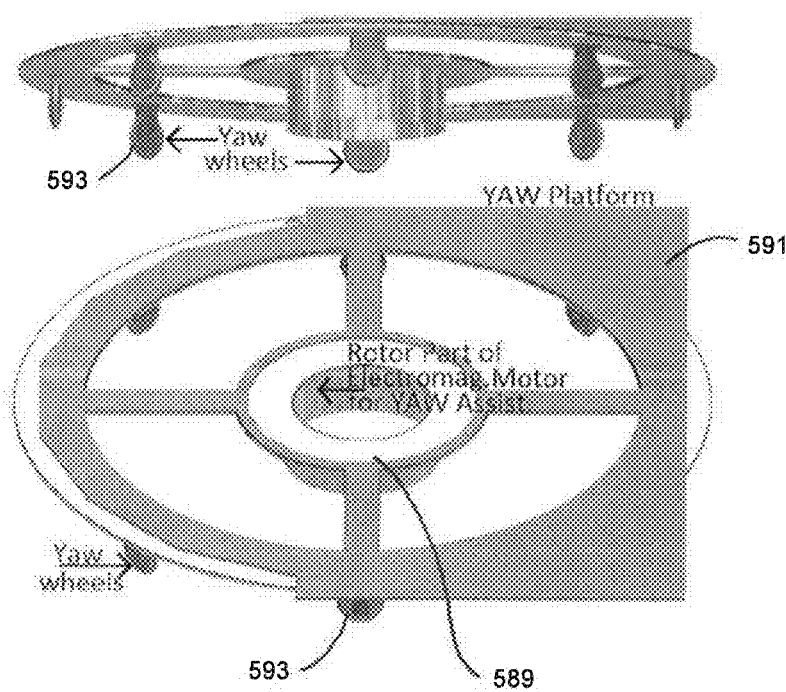

STABILIZED HORIZONTAL-AXIS WIND TURBINE

CROSS REFERENCE TO RELATED APPLICATIONS

This application claims the benefit of U.S. provisional application Ser. No. 62/820,066, filed Mar. 18, 2019, and U.S. provisional application Ser. No. 62/990,349, filed Mar. 16, 2020, the disclosures of which are hereby incorporated by reference herein. The appendices of these applications form a part thereof and are incorporated herein.

STATEMENT REGARDING FEDERALLY SPONSORED RESEARCH OR DEVELOPMENT

Not applicable.

BACKGROUND OF THE INVENTION

This invention relates to horizontal axis wind-driven turbines (HAWTs). It has particular applicability to floating wind-driven turbines, but its utility is not limited thereto.

Traditional wind turbines are horizontal-axis machines having generally vertical blades supported by a hub carried by a horizontal shaft. The horizontal shaft is connected to a gearbox or other drive train, a brake assembly, and a generator. The horizontal shaft, drive train, brake assembly, and generator are covered by a nacelle, which is in turn rotatably mounted on a vertical mast or tower. The blades are generally mounted upwind of the mast to avoid turbulence caused by the mast. The nacelle and the assembly of parts contained by the nacelle are frequently referred to as the "nacelle," and that terminology is used herein, unless otherwise clearly indicated. The nacelle's rotational position ("yaw") is controlled by positioning motors directly below the nacelle. The yaw motors keep the axis of rotation of the blades constantly aligned with the wind when the turbine is in operation (zero degree angle of attack).

Commercial wind turbines (HAWTs) typically have a cut-in wind speed (at which the turbine starts to turn and produce power) of about seven to nine miles per hour (3-4 m/sec), a rated wind speed (at which the turbine first generates its rated power) of about thirty-three miles per hour (15 m/sec), and a cut-out speed (at which the turbine is prevented from turning to prevent damage to the turbine) of about fifty-six miles per hour (25 m/sec). Commercial wind turbines are designed to produce a constant electrical output at wind speeds between rated wind speed and cut-out wind speed. To maintain a constant rotational speed, the efficiency of the blades is decreased as wind speed increases above the rated speed. This is typically accomplished with "blade-pitch" motors in the hub, which turn the blades to alter their angle of attack. The blade-pitch motors are controlled by a computer which receives signals from sensors measuring such things as wind speed, blade position, and rotational speed (power production). When wind speed exceeds the cut-out value, the blade-pitch motors furl the blades by turning them with their leading edge facing the wind, and brake the rotor (horizontal shaft). The blade pitch-control mechanism produces an area of weakness in the blade-hub structure and adds complication to the design.

Industrial wind turbines typically have blades ranging from 100 to 150 feet in length, mounted on a tower (mast) that is about 200-270 feet tall. The steel tower is anchored in a platform of more than a thousand tons of concrete and steel rebar, thirty to fifty feet across and six to thirty feet deep. The platform is critical to stabilizing the immense weight of the turbine assembly. A typical industrial wind turbine weighs between one hundred fifty and three hundred fifty tons; the nacelle weighs fifty to seventy five tons, the blade assembly weighs thirty-five to forty-five tons, and the tower (mast) weighs seventy to two hundred twenty tons (www.wind-watch.org/faq-size-p.php).

Wind turbines also require a great deal of clear space—ten rotor diameters in the direction of the wind, and three rotor diameters in every other direction. In a location in which the wind can come from more than one direction, this requires a spacing of ten rotor diameters in every direction, or a total clear space of over eighty acres per tower.

Placing wind turbines off-shore has long been seen as desirable, to obtain the unobstructed space required, and to take advantage of the relatively high average wind speed in these locations. Wind speed is particularly important, because the kinetic energy of wind is proportional to the cube of its speed. If the average speed of wind off-shore is double the speed onshore, the energy available to be harvested is eight times as great. Off-shore wind turbines may be even larger than land-based industrial turbines, because they, or their components, can be transported on ships rather than by road (www.energy.gov/eere/wind/how-do-wind-turbines-work).

Building off-shore wind turbines in the United States is more difficult than in many European locations, where many suitable off-shore locations are in shallow water. Most of the U.S. suitable locations are located in deep water, having a depth of sixty meters or more. Traditional bottom-mounted supports, as are used in shallow water, are not economical at such depths.

Floating platforms, tethered to the sea floor, have been proposed and have been tested. Such platforms are generally based on oil and gas platform technologies. The dynamic nature of the wind turbine and its top-heaviness place additional requirements on a floating platform. Three principal schemes have been proposed—a spar buoy which relies on a large submerged mass to maintain stability; a semisubmersible design, in which several spaced-apart cylinders are filled with ballast, such as water; and a tension-leg platform in which anchors are connected by tension lines to spaced-apart tie points on the platform. As applied to a horizontal-axis wind turbine, all of these approaches, particularly the first two, require a very large weight as compared with the swept area of the turbine. The ratio of swept area to overall weight is increasingly recognized as an important consideration in floating wind turbine design.

Although the approaches previously suggested may be sufficient to keep the structure afloat, they do not provide the kind of stability needed for efficient operation of the turbine. A horizontal-axis turbine generally requires that wind striking the blades be parallel to the axis of rotation within a very few degrees. Any rotational movement of the turbine's mast toward or away from the wind ("pitch") greatly reduces the efficiency of the turbine. Otherwise stated, any pitch in the floating platform will cause a corresponding change in the angle of attack. An angle of attack varying from zero by even two or three degrees greatly reduces the efficiency.

The axis of the turbine must also rotate around the vertical axis of its mast ("yaw"). The stability problem of all conventional horizontal axis wind turbines, both on land and particularly off-shore, is exacerbated by the need for yaw positioning motors, frequently eight or more motors, at the top of the mast. These yaw motors make the turbine even more top-heavy.

Further background of the invention is found in my aforesaid provisional applications, in Selsam, U.S. Pat. No. 10,024,307, and in von Heland, U.S. Published Application 2017/0241408.

BRIEF SUMMARY OF THE INVENTION

Applicant has observed that of all the motions possible for a floating horizontal axis wind turbine—heave, sway, surge, roll, pitch, and yaw—only the yaw and pitch components have a substantial effect on the efficiency of the turbine. He has therefore devised simplified means for controlling those two variables, so as to produce a floating horizontal axis wind turbine that is efficient in cost, weight, and operation. He has also noted that the simplified construction makes possible ways to mount multiple wind turbines in a much more economical and compact way than hitherto possible. The system is substantially independent of the type of flotation system employed. Some aspects of the invention are also applicable to land-based wind turbines.

In accordance with one aspect of the invention, a wind turbine is provided that has a set of generally vertical blades which sweep around a horizontal axis of rotation. An upright structure extending below the sweep of the blades is supported by a generally horizontal base. In embodiments, the base is a floating base. The upright structure supports the blades and nacelle, and maintains the horizontal axis of rotation fixed against yaw with respect to the upright structure. That is to say, the nacelle is fixed to the upright support and cannot rotate in a horizontal plane with respect to the upright structure. The upright structure is mounted to a rotatable support carried by the base, so that the upright structure, the nacelle, and the blades rotate (yaw) together with respect to the base.

In embodiments, the center of gravity of the turbine is positioned behind the axis of rotation of the support. This arrangement provides automatic control of yaw, so that the axis of rotation of the turbine is always aligned with the wind, with the blades of the turbine facing the wind. In embodiments, the yaw control is supplemented or replaced by an active yaw control at or adjacent the level of the base. Such active control, may, by way of example, include electromagnetic force applied at a central hub of the rotatable support.

Because the entire turbine structure, including blades, nacelle, and upright structure, is always pointed into the wind, the upright structure needs to be engineered to withstand wind pressure in only a single direction. Furthermore, the break in a traditional wind turbine, between the mast/tower and the rotating nacelle, can be eliminated. This further reduces the weight and complexity of the nacelle. The design allows for the upright structure to be a tripod structure, each leg of which can be of far less mass than a traditional mast, and the entire weight of the upright support structure can be dramatically reduced. Two legs of the tripod may lie in a plane parallel to the plane of sweep of the turbine blades (i.e., perpendicular to the axis of rotation of the blades) and spaced behind the turbine blades; the third leg of the tripod may lie in the vertical plane of the axis of rotation of the blades. The two vertical tripod legs provide a strong, stable support for the nacelle and blades, particularly when the platform rolls. Moving yaw control mechanisms to the base of the turbine greatly reduces the top-heaviness of a traditional horizontal-axis wind turbine. It also greatly reduces torque forces at the base of the turbine and distributes the weight of the turbine over a much larger area. This not only strengthens the structure, but enables the structure to be mounted on surfaces, such as flat roof tops, that have heretofore been incapable of supporting a horizontal axis wind turbine.

Traditional yaw-controlling motors are eliminated. In embodiments, the rotatable support is mounted for rotation within a ring structure; in those embodiments, the rotatable structure may comprise an inner ring rotating inside the ring structure. It will be understood that either the inner ring or, preferably, the outer ring may be reduced to discrete supports. In embodiments, a brake is provided to hold the upright structure relative to the ring when the ring pitches or rolls.

In accordance with another aspect of the invention, particularly adapted for use with a floating horizontal axis wind turbine but having broader utility, the pitch of the axis of rotation of the blades relative to the upright structure is adjustable and is controlled by a pitch control mechanism.

In embodiments the pitch is controlled by an adjustable-length strut having a load path to a support. In embodiments, the support is the rotatable support mentioned above. In embodiments, the adjustable strut comprises the third leg of the tripod tower mentioned above. In those embodiments, the adjustable strut may cause part or all of the other two legs of a tripod tower to pivot with respect to the base, in order to keep those legs vertical and the axis of rotation of the blades horizontal.

In other embodiments, the nacelle is pivotable about a generally horizontal axis with respect to the support structure to control pitch. In those embodiments, maximum pitch is limited to prevent the blades from striking the support structure.

In both those embodiments, the pitch of the rotor axis may be controlled by an actuator, such as a hydraulic, mechanical, pneumatic, or electrical actuator. When the actuator is an adjustable strut, the adjustable strut may be shorter than the third leg of the tripod.

In embodiments, sensors detect variations of the support or blades from vertical or of the base or the blade's axis of rotation from horizontal. The sensors send command signals to the pitch control mechanism to maintain the blades' rotational axis horizontal (or otherwise aligned with the wind direction).

In embodiments, the pitch control system is utilized to replace blade pitch motors in the hub for controlling and stabilizing the output of the turbine. When wind speed begins to exceed rated speed, the pitch of the nacelle (and horizontal drive shaft) is altered from horizontal to reduce the efficiency of the blades. By tilting the axis of rotation a few degrees, partial energy shedding will control the speed of rotation of the blades and will produce a constant output. When cut-out wind speed is exceeded, the pitch control system tilts the nacelle and drive shaft to provide full energy shedding; typically pitch will be moved fifteen degrees or more from horizontal. It will be seen that this speed control system can be used both with a fixed base and with a floating base. With a floating base, both base pitch and desired nacelle/drive shaft pitch must be taken into account. It will be understood that the pitch control system may include the sensors typically associated with a blade-pitch controller, as well as sensors associated with the pitch of the turbine.

In accordance with a third aspect of the invention, multiple turbines are mounted to an upright structure on a single mounting platform, the mounting platform being rotatable with respect to the base. The turbines are fixed against yaw with respect to the upright structure. This arrangement allows all turbines on the mounting platform to be fixed against yaw with respect to the platform and thereby ensures that none of the turbines sees the wake (downwash) of another turbine mounted to the platform. The support is preferably mounted with the combined center of gravity of the support and the turbines mounted to it behind the center of rotation of the mounting platform.

BRIEF DESCRIPTION OF THE DRAWINGS

FIGS. 14A, 14B, and 14C are views in front elevation, top plan, and top perspective, respectively, of a stator part of the generally horizontal support of FIGS. 13A-C; FIG. 14D is a detail of FIG. 14C.

FIGS. 15A, 15B and 15C are views in front elevation, bottom perspective, and top perspective, respectively, of a rotor part of the generally horizontal support of FIGS. 13A-C.

DETAILED DESCRIPTION OF INVENTION

Figure 1:
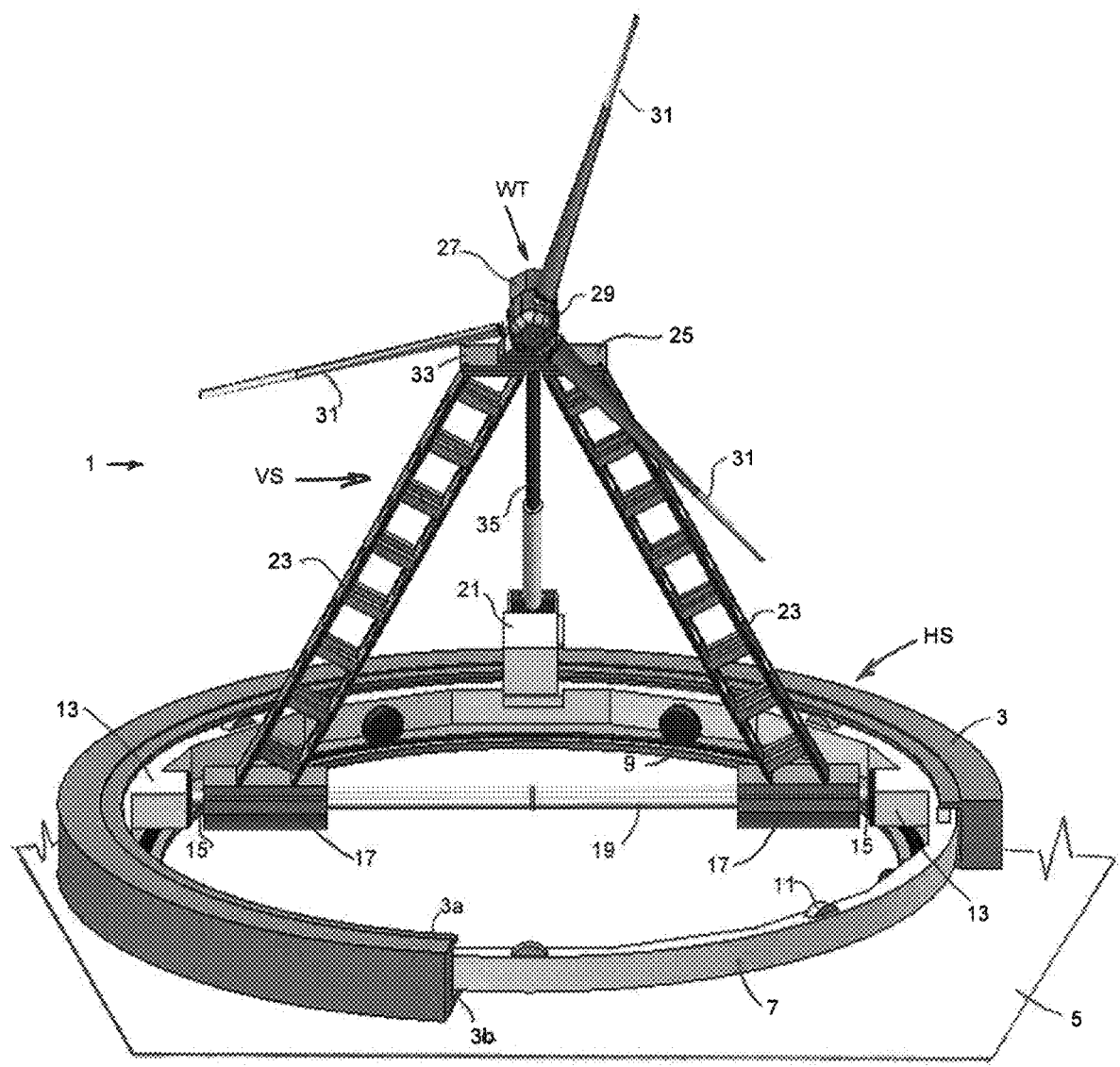
FIG. 1 is a view in front perspective-of an illustrative embodiment of a stabilized horizontal-axis wind turbine of the present invention.
Figure 2:
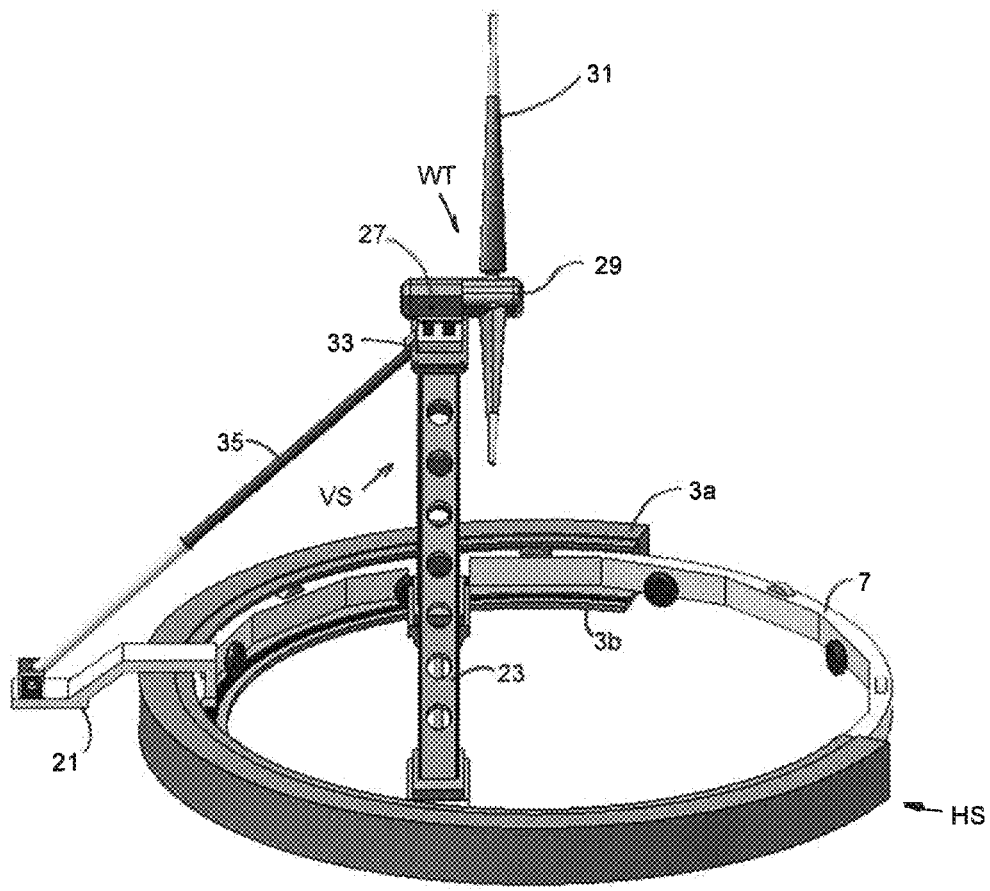
FIG. 2 is a view in side perspective-of the device of FIG. 1.

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense. Features from each embodiment may be combined with other embodiments.

Referring now to the drawings, and in particular FIGS. 1-4, a stabilized horizontal-axis wind turbine 1 in accordance with an embodiment of the present invention includes a generally horizontal support structure HS, with a generally vertical support structure VS mounted to it and a wind turbine WT mounted to the generally vertical support structure VS.

The generally horizontal support structure HS includes a stationary ring 3 mounted on a floating platform shown schematically at 5. The stationary ring 3 forms a race having an upper arm 3a and a lower arm 3b for supporting a rotatable inner ring 7. The rotatable inner ring 7 has lower wheels 9 riding on the lower arm 3b of the stationary ring 3 and supporting the rotating inner ring. The rotatable inner ring 7 also has upper wheels 11 which can engage the upper arm 3a of the stationary ring 3 should the structure mounted to the inner ring start to tip. The stationary ring 3 is shown partially broken away for clarity.

The inner ring 7 includes two bosses 13 which are journaled to receive stub shafts 15 carried by support blocks 17. The support blocks 17 are connected to each other by structural tubes 19 which act as tension elements and also cause the blocks 17 to rotate together. The bosses 13 are positioned well behind a diameter of the inner ring 7, so that the support blocks 17 and tubes 19 lie on a chord having a length smaller than the diameter of the inner ring 7. A support bracket 21 is mounted to the rotatable inner ring 7 halfway between the bosses 13 on the smaller arc of the inner ring 7.

The generally upright support structure VS is mounted to the rotating inner ring through the support blocks 17 and support bracket 21.

Slanted columns 23 are mounted at their lower ends to the rotatable support blocks 17. The upper ends of the slanted columns 23 support a pedestal 25. The columns 23 are formed steel I-beams of far less mass than a traditional tower and form generally vertical legs. Fixedly mounted on the pedestal 25 is the nacelle 27 of a horizontal-axis wind turbine WT. The wind turbine WT also includes a rotatable hub 29 carrying blades 31. The nacelle 27 includes a drive train and a generator. The pedestal 25 also supports a controller 33.

An adjustable-length third leg 35 is pivoted at its lower end to the support bracket 21 and is pivoted at its upper end to the pedestal 25. The third leg 35 is illustratively a hydraulic cylinder operated by a hydraulic pump, not shown, under the control of controller 33.

Lengthening or shortening the leg 35 causes the legs 23 to pivot with their supports 17, thereby changing the pitch of the wind turbine WT with respect to generally horizontal support structure HS, in this embodiment the floating platform (base) 5.

In operation, because the center of gravity of the generally upright support structure VS is behind the center of the rotatable inner ring 7, the force of wind striking the generally upright support structure VS and the turbine WT will push them into alignment with the wind. This automatic yaw control eliminates the need for the usual yaw motors at the top of the structure, as well as the torque exerted by those motors on the usual mast/tower structure. The weight associated with the automatic yaw mechanism is instead distributed to the bottom of the structure, where it helps stabilize the structure. This is particularly important in a floating wind turbine.

Figure 3:
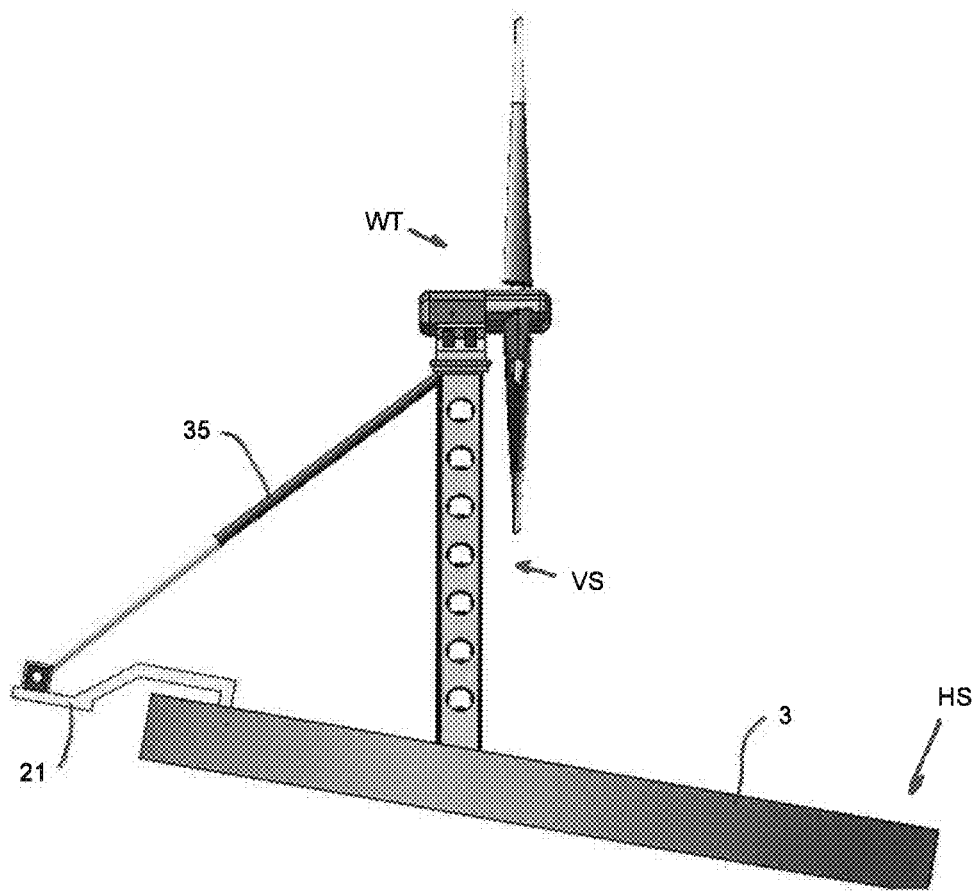
FIG. 3 is a view in side elevation of the device of FIGS. 1 and 2, showing response of a pitch control of the device to pitching of a floating platform on which it is mounted.

Pitch motion of the floating platform 5 is compensated by the adjustable third leg 35. The controller 33 is associated with sensors which measure pitch of the floating platform as well as the divergence from horizontal of the drive shaft driven by the hub 29. In response to changes in pitch, the controller lengthens or shortens the leg 35 to rotate the vertical legs 23 about the shafts 15 and maintain the wind turbine horizontal, to harvest the maximum power from the wind. If, as shown in FIG. 3, the forward pitch of the floating platform becomes great enough that the force of the wind might be insufficient to hold the upright structure against movement away from the direction of the wind, the controller 33 may apply a braking force between the inner ring 7 and the outer ring 3.

It is also envisioned that the controller 33 senses the speed of rotation of the wind turbine WT, or equivalently the electrical output of the wind turbine WT, and adjusts the pitch of the wind turbine WT to maintain a constant speed and electrical output in the region of wind speeds at which power shedding is required to maintain a constant output at rated power production. For this purpose, the controller 33 may receive signals from the same sensors utilized to control blade pitch in a conventional horizontal-axis wind turbine. It may also use artificial intelligence to predict pitch of the generally horizontal support HS. Thus, in the wind regime between rated speed and cut-out, the pitch angle may be adjusted a few degrees away from horizontal to decrease efficiency and maintain constant output. When wind speeds increase to cut-out speed, the controller 33 tilts the wind turbine WT a larger amount, say fifteen degrees from horizontal, to stall the turbine. The usual brake on the drive shaft may also be used in conjunction with this pitch control.

The inventor has noted that the apparent wind speed and direction "seen" by each blade varies at every point along the blade's length, requiring the surface of the blade to be twisted. Conventional speed control, by altering the pitch of each blade, slows the rotation of the turbine by creating increased drag on the blade. This exerts tremendous forces on the blade, trying to break off the blade. Controlling speed of rotation by altering the pitch of the axis of rotation of the turbine, as in the present invention, does not create these enormous drag forces. It therefore is believed that the maximum power produced by the turbine can be increased and the cut-out wind speed can be increased, thereby greatly increasing the power production of the turbine in accordance with the present invention.

Roll of the floating platform (undulations of the platform from side to side relative to the generally upright support structure VS) does not affect performance of the wind turbine WT, but does stress the generally upright support structure VS. The spread legs 23 offer far better inherent resistance to these forces than does the traditional tower structure.

Figure 4:
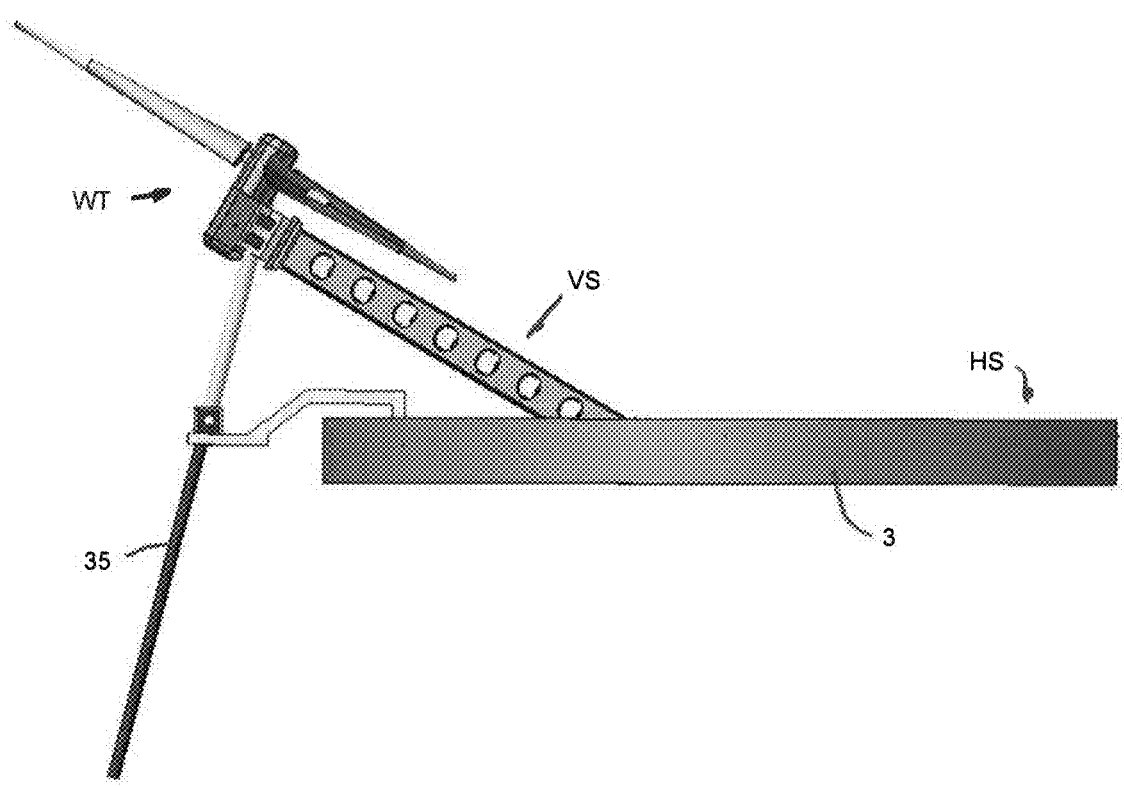
FIG. 4 is a view in side elevation thereof, showing the device lowered for transport or to withstand extremely high winds, such as hurricane-force winds.

As shown in FIG. 4, the pivot support for the legs 23 and the construction of the third leg permit the third leg 35 to be dropped relative to the support bracket 21, either passing through it or adjacent it. This allows lowering the generally upright support structure VS. When lowered, the device is equipped for easy towing to a desired location or for weathering hurricane-like winds.

Figure 5:
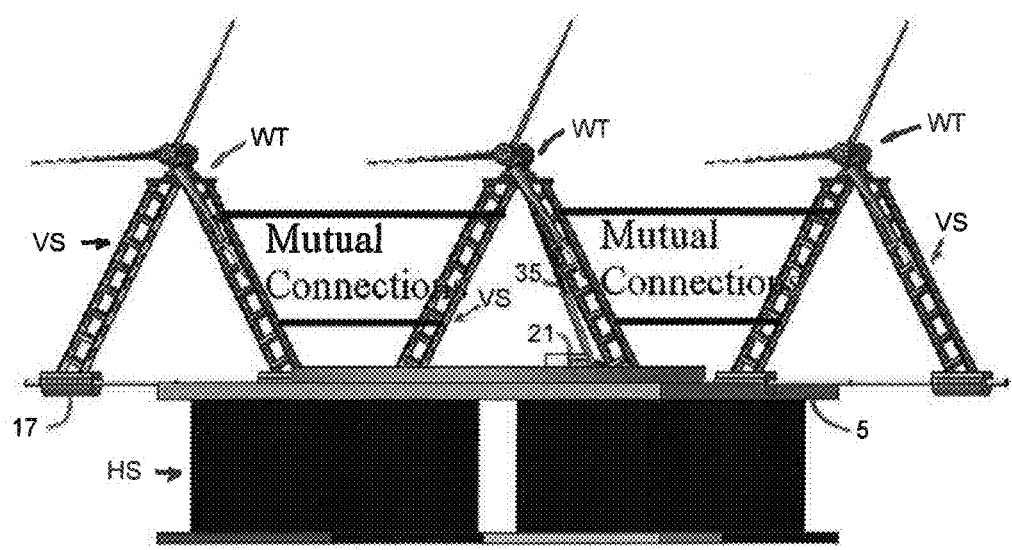
FIG. 5 is a view in front elevation of another embodiment, having three turbines in accordance with FIGS. 1-4 mounted on a single floating platform for yawing and pitching together as a single unit.

As shown in FIG. 5, the design of the stabilized horizontal-axis wind turbine 1 permits easy installation of more than one wind turbine on a single floating platform 5. In this embodiment, two additional generally upright support structures VS are connected to the central generally upright support structure VS. This arrangement causes all three wind turbines WT to yaw and pitch with the central structure. Because the three generally upright support structures VS are mechanically locked to each other and therefore yaw together, there is no chance that the downstream wind flow of any of them will interfere with the operation of the others. Therefore, they can be placed much closer together than would normally be permissible. Further, all three share a common pitch mechanism, namely pitch control leg 35. This embodiment also does not require a much larger floating platform than a single HAWT. All of these considerations greatly reduce the cost and complexity of scaling the system up.

Figure 6:
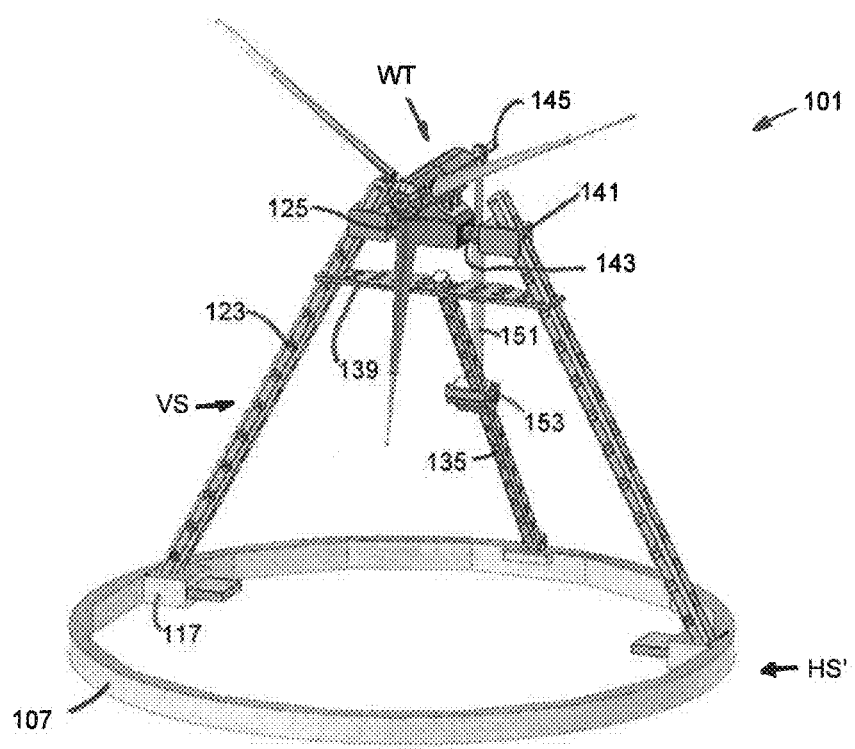
FIG. 6 is a view in perspective of another embodiment having three fixed legs, a tiltable mount for a nacelle of the device, and a pitch control rod mounted to the third leg.
Figure 7:
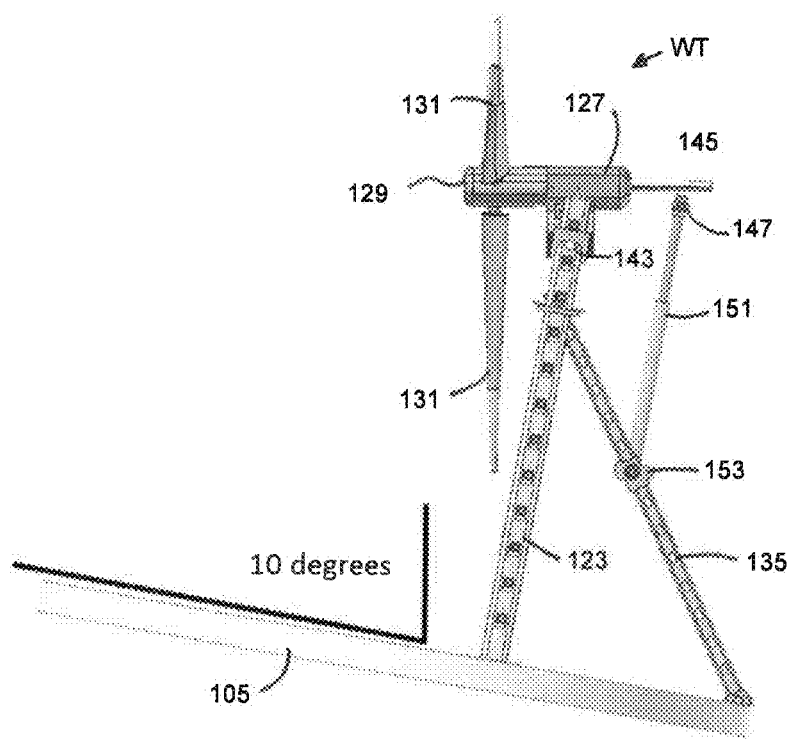
FIG. 7 is a view in side elevation of the device of FIG. 6, showing its response to a ten degree rearwardly downward pitch of the floating platform on which it is mounted.

Another embodiment 101 of the stabilized horizontal-axis wind turbine of the invention is shown in FIGS. 6 and 7. This embodiment differs from the first in replacing the rotatable support 17 for the legs 23 with a fixed support 117 for legs 123 and replacing the adjustable third leg 35 with a fixed leg 135 attached to a cross-brace 139. The fixed leg 135 may be mounted to a boss on the rotatable inner ring 107. In this embodiment, the turbine pedestal 125 is rotatably supported by bearing blocks 141 mounted to upper portions of the legs 123 through stub shafts 143. A rigid extension bar 145 on the back side of the nacelle 127 is connected by a pivot 147 to the upper end of an extendible arm 151. The extendible arm 151 is illustratively a hydraulic cylinder, the lower end of which is connected to the fixed third leg 135 by a pivot 153. Illustratively, the pivot 153 houses a controller for controlling the hydraulic cylinder 151. In other embodiments, the pivot 153 is a pinion moving along a rack on the leg 135. It will be seen that the cylinder 151 controls the pitch of the wind turbine WT, using control logic similar to that of the first embodiment. In this embodiment, however, the turbine blades 131 remain vertical but the legs 123 move with the floating platform. Therefore, the forward pitch of the wind turbine WT is limited both physically and electronically to prevent the blades from striking the legs 123. As shown in FIG. 7, illustratively this pitch angle is ten degrees. If the floating platform is two hundred feet across and its floats are at its margins, a ten degree pitch would represent about a thirty-five-foot wave. Smaller platforms would be more affected by wave height. If pitch control is utilized for decreasing the efficiency of the turbine at wind speeds above rated speed and below cut-out, the pitch is preferably back rather than forward to reduce interference with the generally vertical support structure VS Likewise, the wind turbine is pitched back at wind speeds above cut-out speed.

Figure 8:
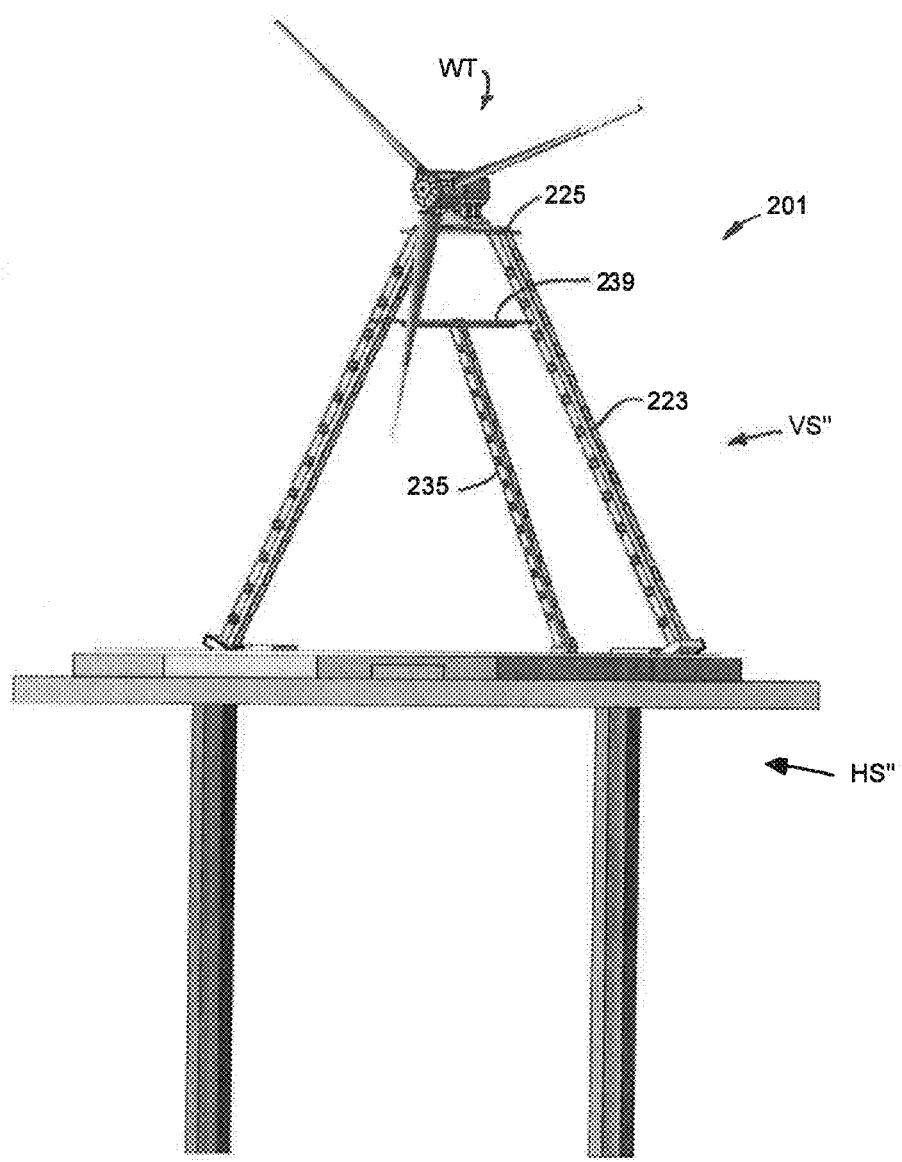
FIG. 8 is a view in front elevation of another embodiment, in which the third leg of the tripod is of fixed length and in which the fixed outer ring is replaced by six jaws.
Figure 9A:
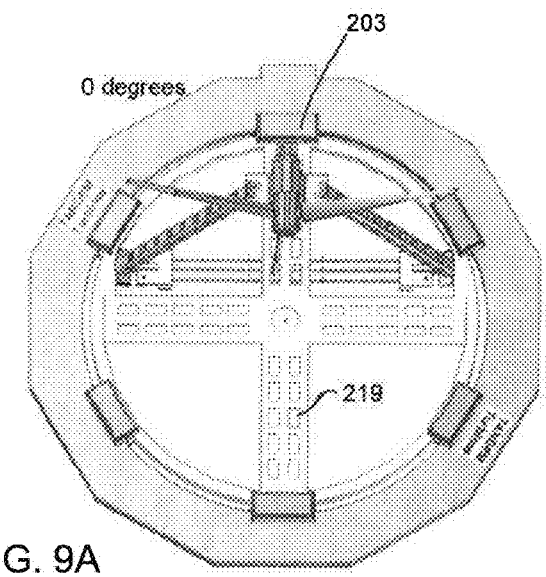
FIGS. 9A-D are top plan views of the embodiment of FIG. 8, showing yaw of the device caused by rotation of the inner ring.
Figure 9B:
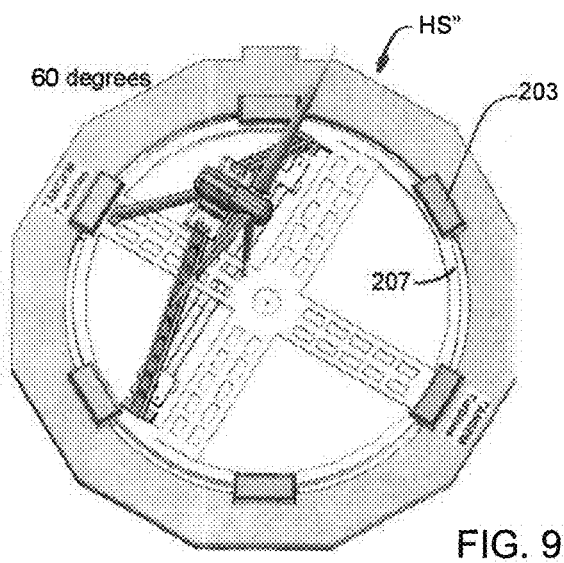
Figure 9C:
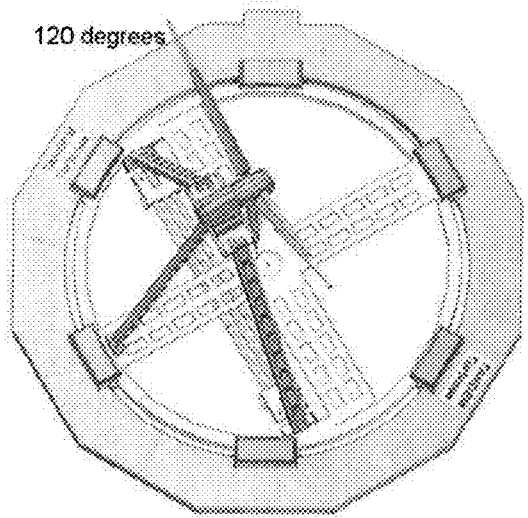
Figure 9D:
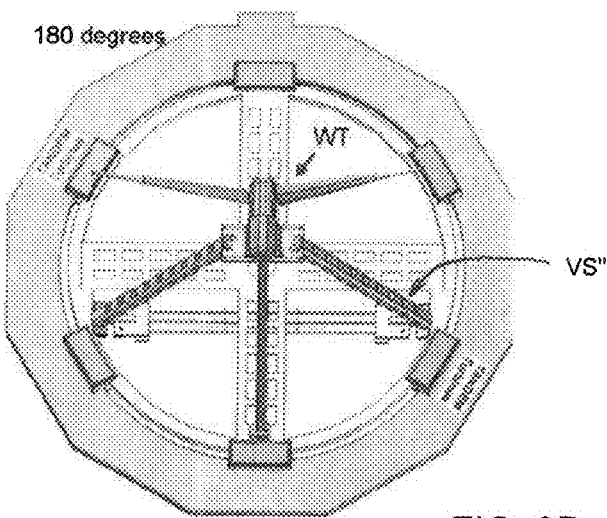
Figure 10:
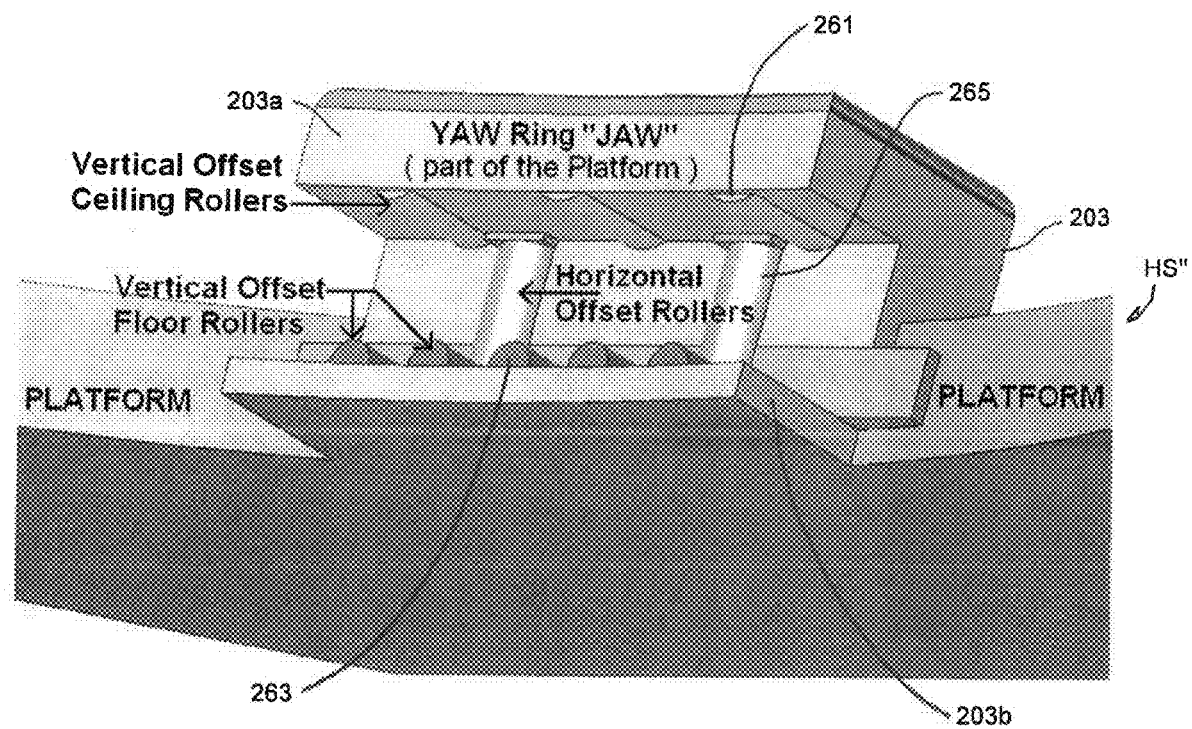
FIG. 10 is a view in perspective of one of the jaws of the device of FIGS. 8 and 9A-D.

FIGS. 8-10 show another embodiment 201 of the invention, having no mechanism to change the pitch of the wind turbine WT. Like the other embodiments, this embodiment is suited to uses in which the horizontal support is fixed against movement. Examples would be on land, in shallow water where the structure may be supported by the sea floor, or on a flat rooftop. Unlike those embodiments, however, it is not suited for use on a floating platform.

In this embodiment, the generally horizontal support HS" includes a rotatable inner ring 207 similar to the inner ring 7 of the first embodiment, but with a cross-brace 219. The outer ring is reduced to six "jaws" 203. As shown in FIG. 10, each jaw 103 has an upper jaw part 203a and a lower jaw part 203b. The upper jaw part 203a carries horizontal rollers 261 for controlling vertical movement of the inner ring 205.

The lower jaw part 203b carries horizontal rollers 263 for supporting the inner ring 205. Vertical rollers 265 are mounted on the outer wall of the jaw 203, to maintain the radial position of the inner ring 205.

The wind turbine WT of this embodiment is supported by a generally vertical support structure VS" having fixed vertical legs 223 like those of the first embodiment. The legs 23 support a wind turbine pedestal 225. Like the pedestal 25 of the first embodiment, the pedestal 225 is fixed. Like the embodiment of FIGS. 6 and 7, a fixed third leg 235 is attached to a cross brace 239.

As shown in FIGS. 9A-D, the entire generally vertical structure VS" and wind turbine WT are permitted to rotate freely to yaw into the wind. Because this embodiment lacks pitch control, conventional blade pitch adjustment must be utilized to maintain rotor speed between rated wind speed and cut-out speed.

Figure 11:
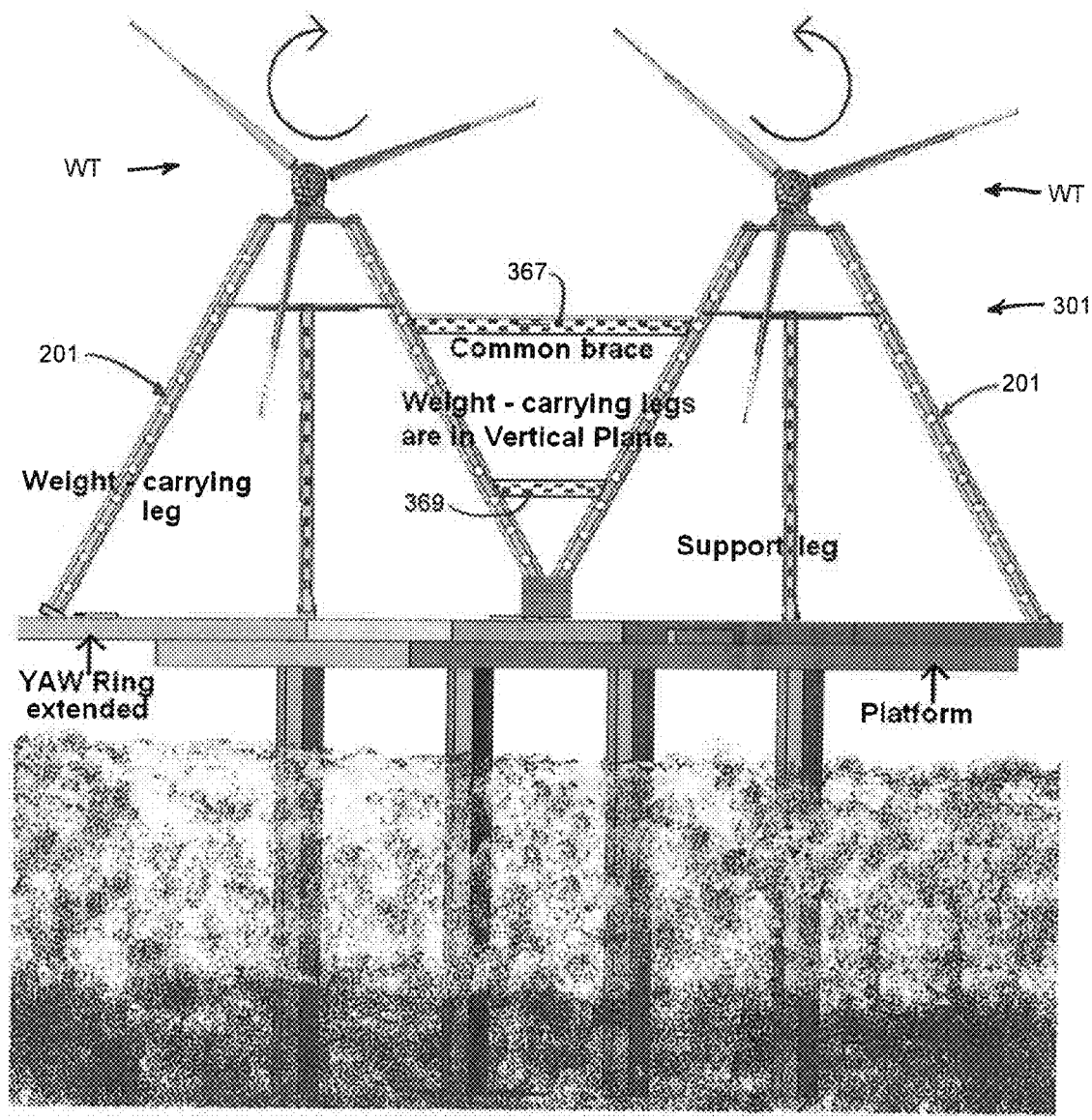
FIG. 11 is a view in front elevation of another embodiment, differing from the embodiment of FIGS. 8-10 in having two turbines mounted to the structure.

FIG. 11 shows another embodiment 301, in which two stabilized horizontal-axis wind turbines 201 of the previous embodiment are mounted on an enlarged inner ring rotating in a larger outer ring. Braces 367 and 369 are provided to ensure that the wind turbines WT face in precisely the same direction as they yaw together. The embodiment 201 is illustratively mounted on the seafloor bed. It could also be mounted on the flat roof of a warehouse or a shopping mall.

Figure 12:
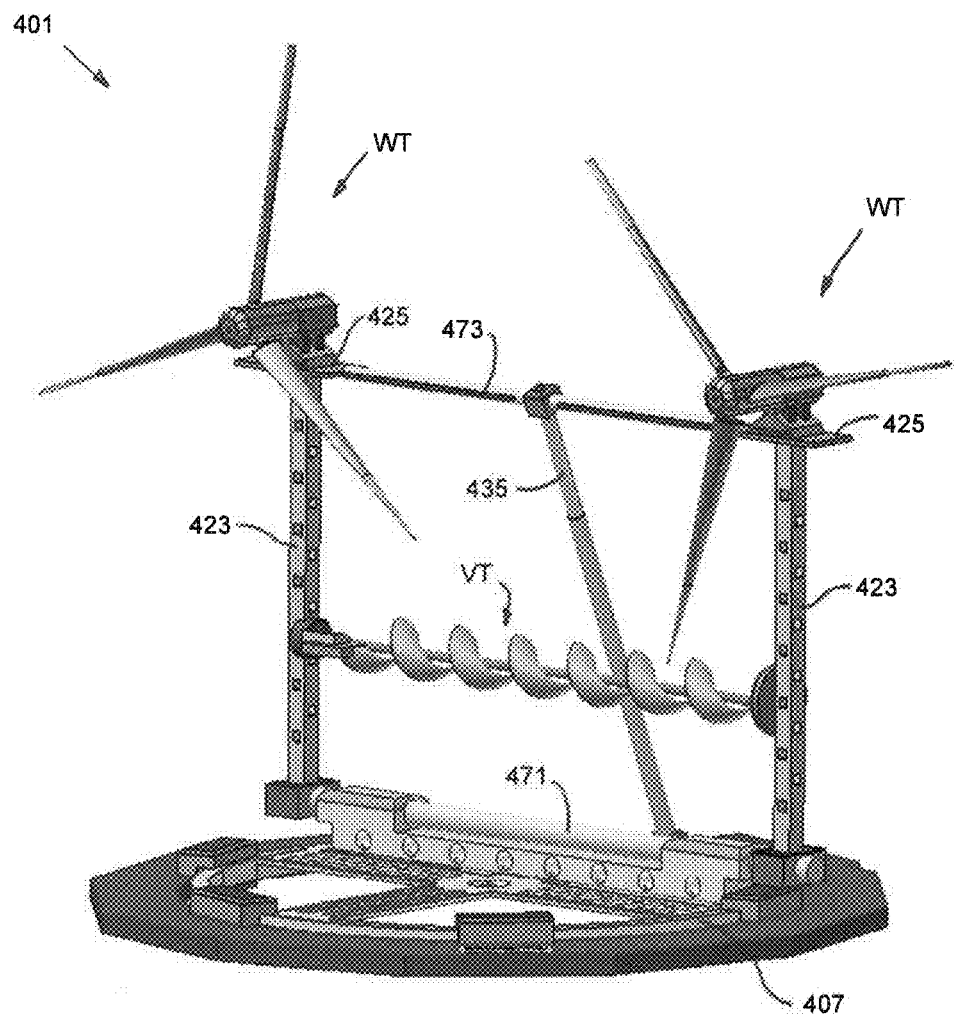
FIG. 12 is a view in perspective of another embodiment, having two horizontal-axis wind turbines and a vertical-axis style wind turbine. The horizontal-axis turbines are each supported by a single generally upright support rotatably mounted to a horizontal support of FIGS. 8-11, and are mutually controlled for pitch.

FIG. 12 shows another embodiment 401 comprising two stabilized horizontal-axis wind turbines WT and a vertical axis style wind turbine VT. The generally vertical support structure VS of this embodiment comprises two vertical columns 423. Each horizontal-axis wind turbine WT is mounted to the top of a vertical column 423, on a fixed pedestal 425. The lower ends of the legs 423 are pivotably mounted to a casting 471 carried behind a diameter of a rotatable inner ring 407. The inner ring and its mounting to the horizontal support HS" may be the same as in the previous embodiments 201 and 301. An adjustable-length third leg 435 is pivotably attached at its lower end to the inner ring 407 and is pivotably attached at its upper end to a stabilizing rod 473 extending between the pedestals 425. The third leg may be controlled in the same manner as the adjustable leg 35 of the first embodiment, to adjust the pitch of the vertical legs 423 relative to the horizontal support structure HS, thereby maintaining the desired pitch of the horizontal-axis wind turbines WT. The vertical axis wind turbine VT is uncharacteristically arranged with its axis horizontal. Vertical-axis wind turbines are normally used with their axis of rotation vertical, because in this orientation the direction of the wind is immaterial. In any other orientation, the vertical-axis wind turbine loses efficiency as wind direction becomes anything except normal to the axis of rotation. Because the device 401 automatically yaws into the wind, it automatically aligns the vertical-axis wind turbine properly. If desired, more than one vertical-axis wind turbine VT can be mounted between the legs 423, preferably rotating counter to each other.

Figure 13A:
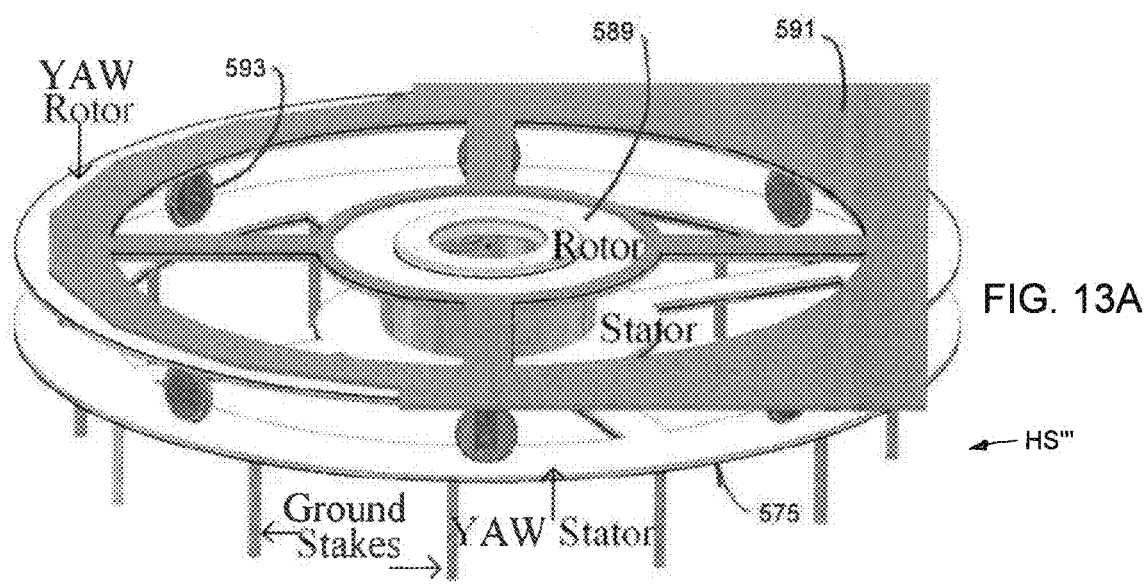
FIGS. 13A, 13B, and 13C are views in top perspective, front elevation, and bottom perspective, respectively, of another embodiment of a generally horizontal support portion of the present invention.
Figure 13B:
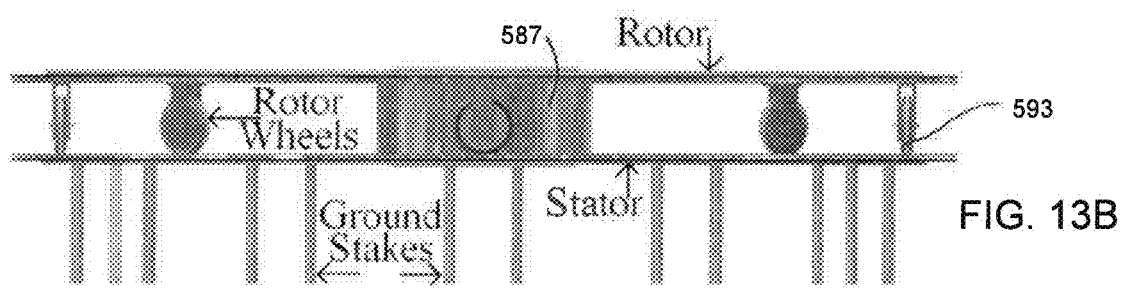
Figure 13C:
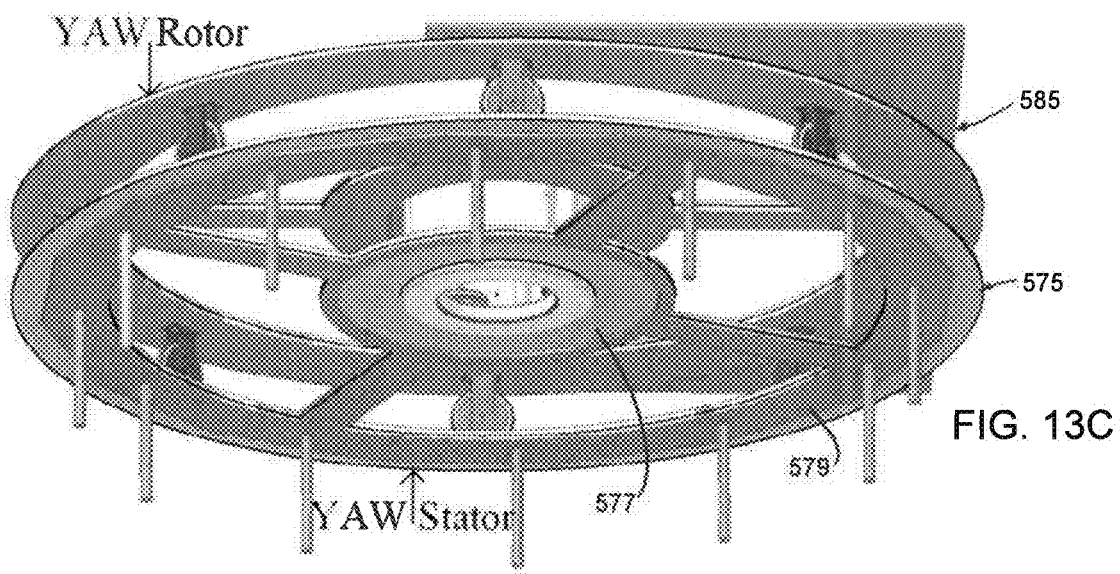

As illustrated in FIGS. 13-15, other horizontal rotating structures may be utilized to support the generally vertical support VS and provide proper yaw for the wind turbine WT. In this embodiment of horizontal support HS''', the rotating support is pivoted at its center, like a lazy Susan, with supports, like wheels or rollers, for support at its periphery. With respect to this embodiment, the fixed portion of the support, mounted to, or comprising, the platform or other base, is denominated a stator, and the rotatable part of the support is denominated a rotor.

In this embodiment, the stator 575 includes a hub part 577 and a peripheral track 579. The hub 577 includes a raised ring 581 having bearing wheels 583 for engaging a sleeve 587 on the rotor part 585. The space below the raised ring 581 may house copper windings for the stator part of an inside-out electric motor.

The rotor part 585 includes a central sleeve 587, attached to a hub 589, and a peripheral support platform 591. Below the periphery of the platform 591, wheels 593 support the platform 591 on track 579 of the stator for rotation around the hub 577. The sleeve 587 may carry windings or other magnetic structure to interact with the windings in the stator to rotate the rotor part 585 and adjust the yaw of a generally vertical support structure and horizontal-axis wind turbine mounted on it. The wind turbine and its support preferably have a center of gravity behind the center of rotation of the rotor 585, so that the wind turbine automatically yaws into the wind. The inside-out motor, however, can assist the yawing movement when needed.

Figure 16:
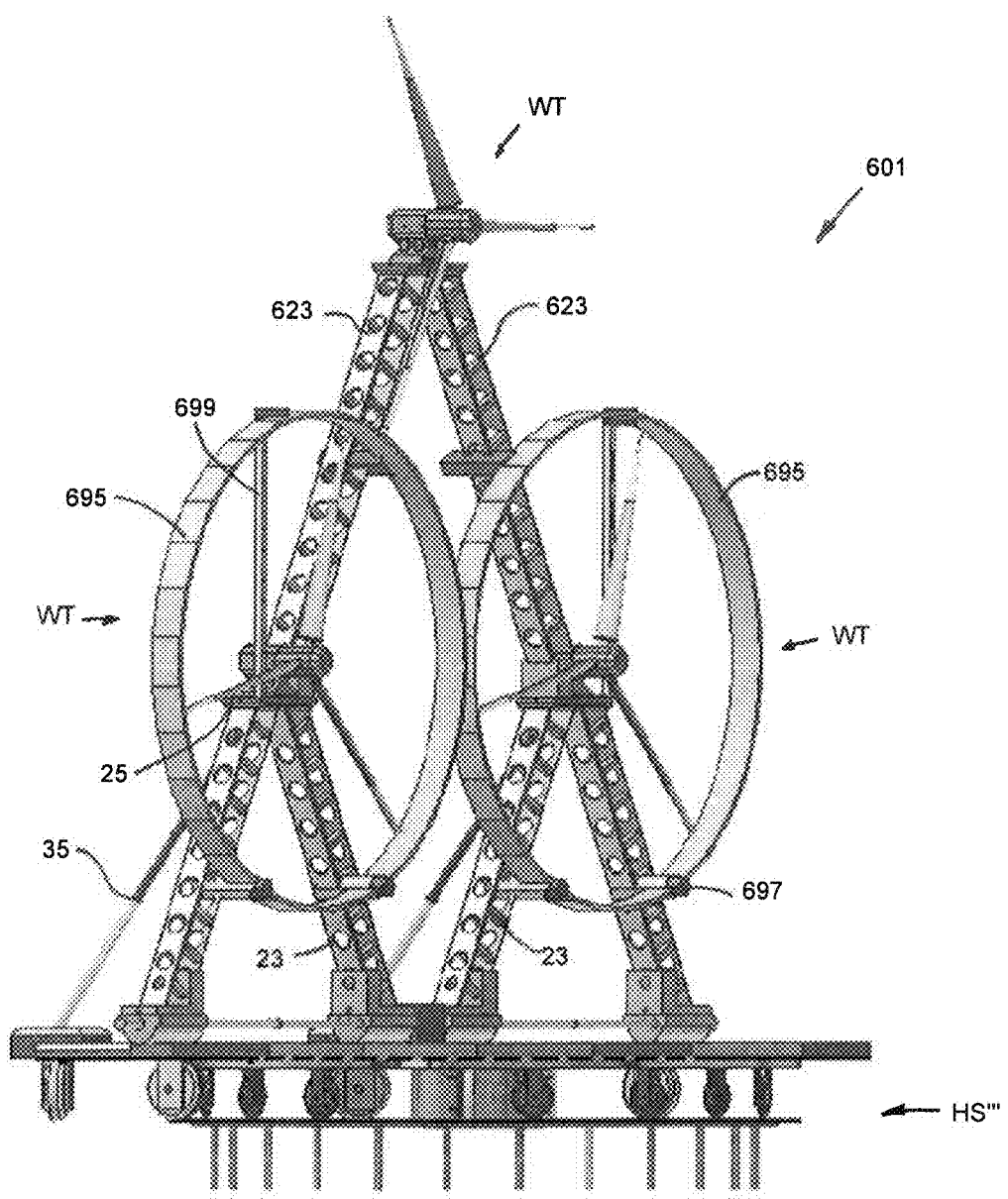
FIG. 16 is a view in left side perspective of an embodiment in which three wind turbines are mounted on the generally horizontal support of FIGS. 13A-C.

FIG. 16 shows an embodiment 601 three horizontal-axis wind turbines mounted on a single horizontal support HS''' in accordance with the embodiment shown in FIGS. 13-15. Two lower generally vertical support structures VS, and the turbines WT mounted to them, are identical with those of the embodiment of FIGS. 1-4, other than being mounted for rotation on a single rotor 585 of the embodiment of FIGS. 13-15. Each has an adjustable-length third leg 35 to control pitch; both legs 35 are connected to a single controller to ensure that they change pitch together.

The third wind turbine includes legs formed of slanted columns 623 mounted immovably to the inside tops of the inner legs 23 of the two lower wind turbines WT. A pedestal 625 at the top of the slanted columns 623 supports a horizontal-axis wind turbine WT.

To protect the wind turbines against air flow interference from each other, cowls 695 are installed around the blades of the lower two wind turbines. The cowls are attached to the legs 23 and 623, as shown, by cantilevered supports 697. If needed, supplemental supports such as spars 699 shown in FIG. 16, may be utilized to stabilize the cowls.

All web sites, publications, patents, and patent applications mentioned herein are hereby incorporated by reference.

In view of the above, it will be seen that the several objects and advantages of the present invention have been achieved and other advantageous results have been obtained.

The invention claimed is:

1. A wind turbine comprising a set of generally vertical blades which sweep around a generally horizontal axis of rotation; a nacelle comprising at least a generally horizontal shaft driven by the set of generally vertical blades and a drive train; an upright tripod structure supporting the nacelle and the set of generally vertical blades, the upright tripod structure extending below a sweep of the set of generally vertical blades, and a generally horizontal base supporting the upright tripod structure, wherein,
    a pitch of the axis of rotation of the set of generally vertical blades relative to the upright tripod structure is adjustable and is controlled by a pitch control mechanism, the pitch control mechanism comprising an adjustable-length strut having a load path to the generally horizontal base,
    the adjustable length strut causing part or all of two generally vertical legs of the upright tripod structure to pivot with respect to the generally horizontal base.

2. The wind turbine of claim 1 wherein the pitch control mechanism includes a controller programmed to orient the axis of rotation of the set of generally vertical blades away from horizontal to slow rotation of the set of generally vertical blades.

3. The wind turbine of claim 2 wherein the set of generally vertical blades lack a mechanism to control the pitch of individual blades relative to the generally horizontal axis of rotation.

4. The wind turbine of claim 1 wherein the upright tripod structure comprises two generally vertical legs spaced behind the set of generally vertical blades and a third leg and wherein the pitch of the axis of rotation of the set of generally vertical blades relative to the generally horizontal base is controlled by changing a length of the third leg.

5. The wind turbine of claim 1 wherein the generally horizontal base is floating, and wherein the pitch control mechanism includes a controller programmed to maintain the axis of rotation of the set of generally vertical blades generally horizontal as the generally horizontal base pitches.

6. The wind turbine of claim 1, wherein the upright tripod structure maintains the nacelle and set of generally vertical blades fixed against yaw with respect to the upright tripod structure, and the upright tripod structure is rotatably mounted to the generally horizontal base, so that the upright tripod structure, the nacelle, and the set of generally vertical blades rotate together with respect to the generally horizontal base.

7. The wind turbine of claim 6 wherein as the base pitches the center of gravity of the turbine is positioned behind the axis of rotation of the upright tripod structure.

8. The wind turbine of claim 6 comprising an active yaw control at or adjacent the level of the generally horizontal base.

9. The wind turbine of claim 6 comprising a rotatable support for the upright tripod structure, the rotatable support being mounted for rotation within a ring structure on the generally horizontal base.

10. The wind turbine of claim 9 wherein the rotatable structure comprises an inner ring rotating inside the ring structure.

11. The wind turbine of claim 10 wherein ring structure comprises discrete spaced-apart supports supporting the inner ring vertically and horizontally.

12. The wind turbine of claim 6 wherein the generally horizontal base is floating, and wherein the pitch control mechanism includes a controller programmed to maintain the axis of rotation of the set of generally vertical blades generally horizontal as the generally horizontal base pitches.

13. The wind turbine of claim 12 further comprising a brake deployable to hold the upright turbine structure relative to the generally horizontal base when the generally horizontal base pitches or rolls.

14. The wind turbine of claim 6 wherein a plurality of turbines are mounted to the upright tripod structure on a single mounting platform, the mounting platform being rotatable with respect to the generally horizontal base and each of the plurality of turbines being fixed against yaw with respect to the upright tripod structure.

15. The wind turbine of claim 14 wherein the upright tripod structure is mounted with a combined center of gravity of the upright tripod structure and the plurality of turbines mounted to the upright tripod structure behind a center of rotation of the mounting platform.

16. The wind turbine of claim 14 wherein the generally horizontal base is floating, the plurality of turbines each comprises a set of blades, the pitch control mechanism maintaining an axes of rotation of each set of blades substantially horizontal as the generally horizontal base pitches.

17. The wind turbine of claim 1 wherein a plurality of turbines are mounted to the upright tripod structure.

* * * * *